Jan. 11, 1938.  A. KEGRESSE  2,105,042
MOTOR VEHICLE WITH VARIABLE PROPULSION
Filed Nov. 13, 1935  3 Sheets-Sheet 1
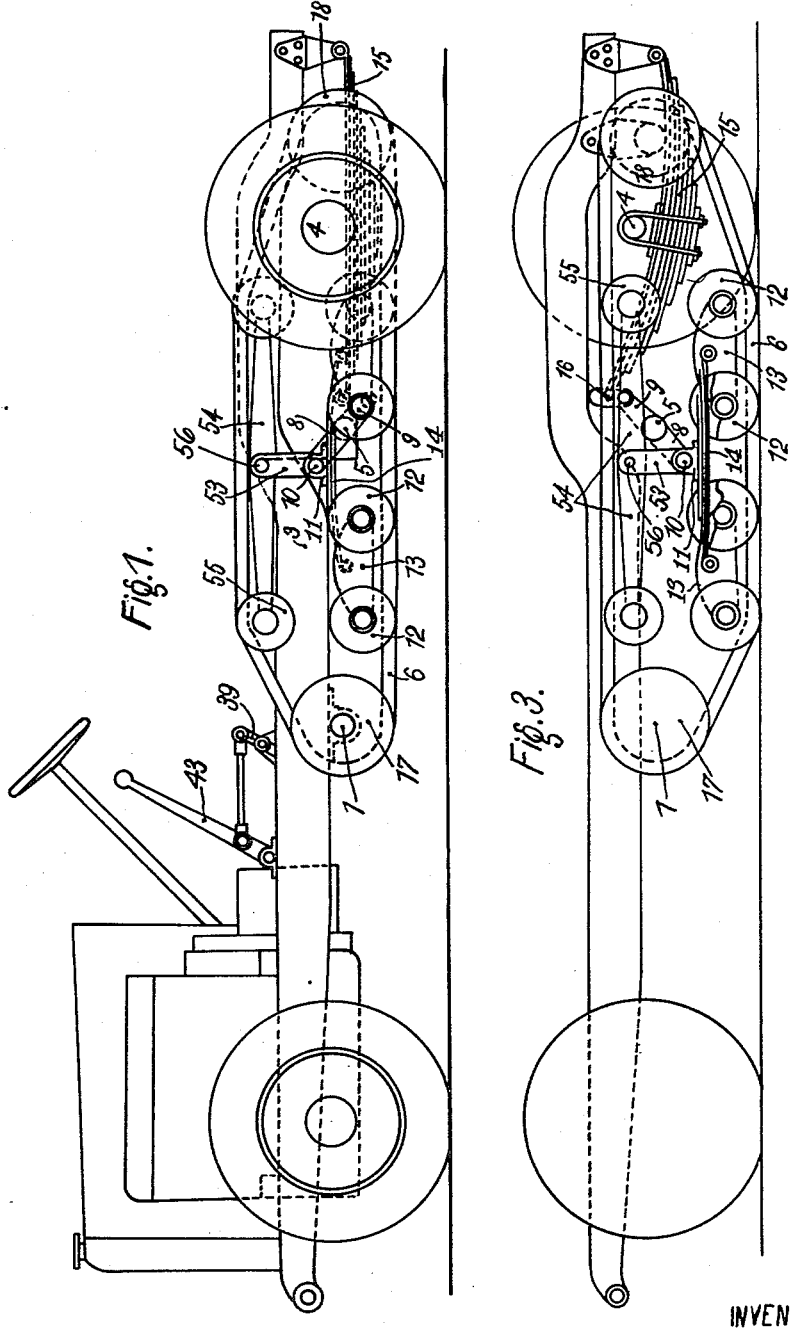
INVENTOR:
Adolphe Kegresse
BY
Emil Bönnelycke
ATTORNEY

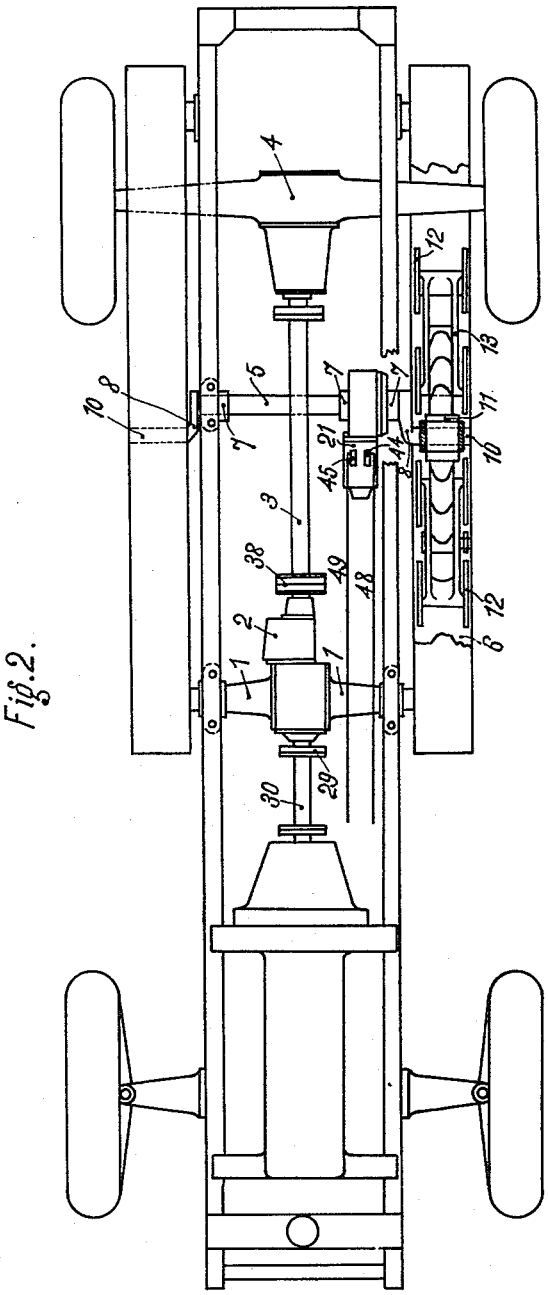

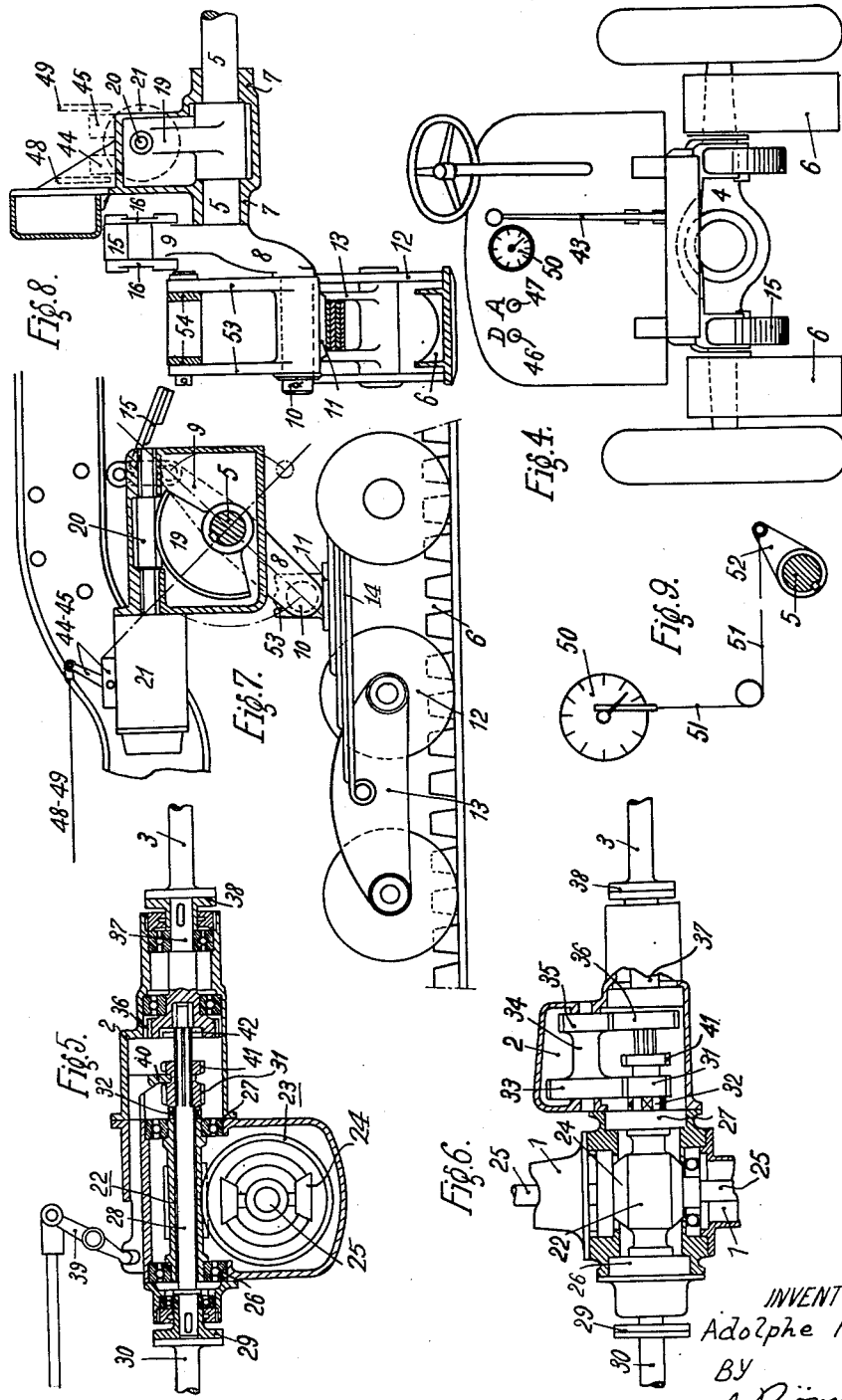

Patented Jan. 11, 1938

2,105,042

UNITED STATES PATENT OFFICE 2,105,042

MOTOR VEHICLE WITH VARIABLE PROPULSION

Adolphe Kégresse, Paris, France

Application November 13, 1935, Serial No. 49,575
In France November 19, 1934

6 Claims. (Cl. 180—9.1)

It is known that in the automobile art, the vehicles which have given the best efficiency on roads and which are the fastest comprise four wheels, two only of which are driving wheels. It is also known that, on "open ground", propulsion by endless track is the most efficient.

Numerous inventors have sought to construct a motor vehicle travelling rapidly on the road and hence on wheels and adapted to be converted (more or less quickly) into a vehicle for travelling over open ground by the addition of an endless track.

Some inventors have recommended and even constructed "all road or all endless track" machines, that is to say, the vehicle could be converted completely from a wheeled vehicle into a vehicle having integral endless tracks or vice versa.

Others have been content to add to the driving axle of a four wheeled motor vehicle an endless track device driven by the same driving axle.

In the first case, the machine is very expensive to construct, because the complete independence of the wheels and the endless tracks necessitates a complicated and heavy mechanism, both on account of the transmission of the movement to the two propelling devices, and also on account of the suspension, the means for actuating the conversion members, the steering of the endless track again, double braking, and so forth.

Furthermore, it is known that it is very difficult to provide a good suspension with an integral endless track. This is all the more correct since, in the present case, it is necessary to provide this vehicle, which is rapid when it is on wheels, with a speed which is as close as possible to this latter speed when the vehicle is travelling on its endless tracks.

The result of all these difficulties is that practically no vehicles of this kind are to be found on the market.

In the second case, construction is simpler but among the known inventions, there are no machines which solve the problem satisfactorily. Thus, in almost all cases, the rear wheels and the endless tracks bear simultaneously on the ground. Since both devices are driven off the same axle, they rotate at the same speed of revolution, but since the diameter of the toothed wheel driving the endless track is inevitably smaller than that of the carrying wheel, there results a very appreciable difference in the speed developed, giving a deplorable efficiency.

In addition, the fact of employing the wheel driving axle for driving the endless track implies a very forward position—relatively to the said axle—of the entire carrying train whence a poor distribution of weight on the axles when the endless track bears on the ground. The carrying train in the vicinity of the centre of the chassis receives almost the whole of the load, thus depriving the steering road wheels of the adhesion necessary to ensure good steering.

In this class of vehicle, no device is to be found for adding rapidly and while travelling, to propulsion by wheels, propulsion by endless track or conversely of withdrawing the latter, still while travelling, when its need is no longer felt.

Another very important point is that the constructions proposed heretofore necessitate special automobile mechanism involving a high cost price.

It is furthermore known that the efficiency of an endless track vehicle is lower, the greater the load carried. It is therefore advantageous to employ endless track propulsion, with the least possible weight, always loading the wheels to the maximum permitted by the condition of the ground.

Among the prior art, no devices which satisfy these desiderata are to be found.

The present invention relates to the addition, to a motor vehicle chassis of modern construction, of devices which do not in any way affect the efficiency of the vehicle when travelling on wheels, and rendering it possible, for varied ground, to bring into engagement with the ground while travelling an endless track, the pressure of which on the ground is adjustable, likewise while travelling, without impairing the judicious distribution of the load on the axles.

The invention likewise relates to a device providing, at the same time as the endless track driving mechanism is put into gear, a reduction in speed of the driving wheels in order to give them the same linear speed as the endless track.

The accompanying drawings and the following description will enable the invention to be clearly understood.

Figure 1 shows in elevation the entire machine on its wheels.

Figure 2 is a plan view.

Figure 3 shows the machine in elevation, the carrying trucks being lowered, with a partial section through two rollers, the outer back wheel being removed.

Figure 4 is a back view.

Figure 5 shows in sectional elevation the mechanism for driving the endless track driving axle, combined with the speed reducing mechanism for the wheel axle.

Figure 6 is a part sectional plan view of the preceding device.

Figure 7 is a view in elevation, with part section, of the drive of the carrying axle and its connection with the set of rollers, and also with the suspension springs of the wheel driving axle.

Figure 8 is a profile view, with partial section of the foregoing arrangement.

Figure 9 shows diagrammatically the device for indicating the position of the endless track.

As will be seen in Figures 1 to 4, the machine embodies a standard motor vehicle chassis comprising an engine, a gear box, steering means, a front steering axle and a rear driving axle, all being known and therefore not requiring any special description.

Fixed at one point of the chassis, between the front and rear axles, is a second driving axle 1 (Figures 1, 2, 3, 6) with which is associated a gear case 2 (Figures 2, 5, 6) comprising gear trains described hereinafter. Issuing from gear case 2, is a shaft 3 (Figures 2, 5, 6) driven by the engine for transmitting movement to the rear or driving wheel axle 4 (Figures 1, 2, 3, 4).

Between the driving axle 1 and the wheel driving axle 4, the load carrying trucks, which may be of various types, are disposed on either side of the chassis. In the present case, the said load carrying trucks are shown mounted on the ends of the carrying axle 5 (Figures 1, 2, 3, 7, 8) which is rotatably mounted on the chassis by bearings 7 (Figures 2, 8). The axle 5 terminates at each of its ends and externally of the chassis in two opposite cranks 8 and 9 (Figures 1, 2, 3, 7, 8) of the carrying trucks. The load-carrying trucks, as represented in the drawings by way of example, include the rollers 12, the small equalizing beams 13 (Figures 1, 2, 3, 7, 8) connecting the rollers in pairs, and spring 14 providing a resilient connection between the equalizing beams 13 and the oscillating head 11 mounted on the crank pin 10 of the crank 8 of the carrying axle 5.

The crank 9 opposite to the crank 8 serves as support for the front part of the suspension springs 15 (Figures 1, 3, 7, 8) of the driving wheel axle. For this purpose, shackles 16 (Figures 3, 8) serve as connection between the crank 9 and the springs 15.

Sprockets or toothed wheels 17 (Figures 1, 3) are mounted on each end of the driving axle 1 and ensure the driving of the endless track 6.

A track-carrying pulley or idle guide wheel 18 (Figures 1, 3) is provided behind the wheel driving axle. The endless track 6 (Figures 1, 2, 3, 4, 7, 8) runs over the wheels 17 and 18 and passes under the rollers 12.

Fixed to the carrying axle 5 is a toothed segment 19 (Figures 7, 8) driven by a worm 20 (Figures 7, 8) mounted on the shaft of an electric motor 21 (Figures 2, 7, 8). The latter is fed by the electric system of the chassis.

Regarding the driving axle 1, it comprises in the example selected a worm 22 (Figures 5, 6) driving a corresponding worm wheel 23 mounted on a differential 24 (Figures 5, 6) from which extend on either side the driving shafts 25 (Figures 5, 6) for the sprockets 17 (Figures 1, 3). This assembly is well known in the motor vehicle art and consequently does not necessitate a detailed description.

The worm 22 is supported in the gear case 2 (Figures 5, 6) by two ball bearings 26 and 27 (Figures 5, 6). The said worm is hollow and through it there passes along its axis and with a considerable clearance a shaft 28 (Figure 5) connected at one of its ends by any desired coupling 29 to the drive shaft 30 (Figures 2, 5, 6) of the change speed gear of the vehicle. The other end of the shaft 28 carries a sliding gear 31 (Figures 5, 6) operated from the driver's seat by means of the lever 43 which engages the fork 40 of the sliding gear 31 by means of a lever 39.

In the position shown in Figures 5, 6, the sliding gear 31 is in direct engagement with the worm 22 by means of the dogs 32 (Figures 5, 6) and also meshes with the gear wheel 33 fast on the intermediate shaft 34 which is also fast with the gear wheel 35 (Figure 6). The latter is in constant mesh with the gear 36 (Figures 5, 6) integral with the driving shaft 37 connected by the coupling 38 to the driving shaft 3 (Figures 5, 6) of the wheel driving axle 4.

In the position described and shown in Figures 5, 6 it will be seen that the worm 22 driving the driving axle 1 is driven directly, without any intermediary, by the drive shaft 30, whereas the wheel axle 4 is driven with a reduction in speed corresponding to the difference in the developed diameters of the sprockets 17 and the driving road wheels. This difference in speed is calculated for the same development on the ground.

If now by means of the lever 43 (Figures 1, 4) operated from the driver's seat, the fork 40 (Figure 5) is actuated to move the sliding gear (Figures 5, 6) so that its teeth 41 mesh with the internal teeth 42 of the toothed wheel 34 (Figures 5, 6), it will be seen that:—

(1) The worm 22 no longer receives the movement of the engine. The endless track axle 1 is therefore motionless.

(2) The driving wheel axle 4 is in direct engagement with the driven shaft of the change speed gear, and consequently functions under the same conditions as in an ordinary motor vehicle.

The electric motor 21 may be put into circuit by means of two independent contacts 44 and 45 (Figures 2, 7, 8) each giving one direction of rotation. These contacts are operated from the driver's seat by two pull rods 46 and 47 (Figure 4) acting on the cables 48 and 49 (Figures 2, 7, 8), as in the case of motor vehicle starters. One of the pull rods corresponds to the direction descent and the other to the direction ascent. They may be provided with inscriptions, for example D and A, to avoid any mistake. The installation is completed by an endless track position indicator dial 50 (Figures 4, 9). This is connected by a small flexible cable 51 to a lever 52 (Figure 9) secured to the carrying axle, and consequently follows the positions of the latter.

The oscillating head 11, mounted on the crank pin 10 (Figures 2, 3, 7, 8) carries opposite the spring 14 two arms 53, the upper part of which carries an equalizing beam 54, each end of which carries an endless track supporting roller 55. The equalizing beam 54 is pivoted in its centre 56 to the end of the two arms 53 (Figures 1, 2, 3, 7, 8).

This device will accompany the oscillating head and consequently the carrying trucks in all its movements, and as will be appreciated its object is to maintain the endless track 6 under an almost constant tension, irrespective of the position of the crank pin 10.

The operation is as follows:—

On a good road, the machine is in the position shown in Figure 1, that is to say, the endless track train is raised. The vehicle travels on its wheels like an ordinary motor car. The rear suspension is normal, the springs 15 taking the whole of the rear load. In this case, it has been seen that the sliding gear 31 is in direct engagement by its teeth 41 with the wheel 36 and consequently the worm 22 (Figures 5, 6) does not rotate. The driving axle 1 and the endless track 6 are motionless.

When the necessity of employing the endless track makes itself felt, the driver acts upon the lever 43 to put the endless track axle into gear and to reduce the speed of the wheel axle. He then starts the electric motor 21 by operating the pull rod 46 marked D (descent).

Through the medium of the mechanical transmission described hereinbefore, the electric motor 21 will rotate the carrying axle 5 through a certain angle. The cranks 8 and 9 of the latter will therefore describe a certain arc of a circle carrying along with them the oscillating head 11 of the carrying train which will descend and also the shackles 16 of one of the ends of the rear suspension springs 15 which will ascend.

The driver will be able to follow the position of the endless track train by means of the indicator dial 50 and to regulate the pressure exerted by the endless track upon the ground relatively to that exerted by the wheels. This point is very important. In fact, it renders it possible to secure the maximum efficiency on all kinds of ground by employing the endless track only in the amount necessary for satisfactory operation. Thus, on firm but greasy ground, the endless track will only have to just touch the ground to prevent any skidding. It will be running almost idle, that is to say without any load and hence without absorbing any considerable power. On softer ground, it is possible by referring to the dial 50 to increase the pressure of the endless track on the ground by causing the electric motor 21 to make a few more revolutions.

The adhesion of the endless track will be increased to a maximum on ground which is not very consistent. In this case, the wheels will only just touch the ground and the indicator dial will be at the bottom in the descent direction.

The machine is then in the position shown in Figures 3 and 4.

The converse operation will be effected by acting on the pull rod 47 marked A (ascent). The motor 21 will rotate in the opposite direction and will raise the endless track train by the amount judged necessary by the driver according to the state of the ground. The indicator dial 50 as in the case of the descent direction, will indicate the position of the endless track trucks. The latter being returned to the initial position shown in Figure 1, it will merely be necessary to act upon the lever 43 to secure the direct engagement of the wheel axle and to render the endless train motionless.

The machine is again in its position for travelling on roads.

Electrical contacts may be provided to cut the current automatically when the carrying truck arrives in its end positions.

As may be readily appreciated, the vehicle will be able to pass in a few seconds from the road position (wheels only) to the mixed position (wheels and endless tracks) or vice versa.

It will be noted that on account of the short distance between the carrying axle 5 and the wheel driving axle, the equilibrium of the vehicle, in the case of the position on endless tracks, is changed only a little and in any case in a favourable sense for varied ground, since the slight approach of the carrying axle to the steering axle will have the effect of increasing the propulsive adhesion and of reducing the load on the front axle, hence diminishing the tendency for its wheels to sink into soft ground, while retaining for it a sufficient load to ensure steering.

It is evident that the arrangement described by way of example may be carried into effect in a number of ways, the invention residing above all in the grouping of the separate members of the train of the endless track and of its drive, relatively to those constituting a standard motor vehicle chassis.

Thus, the carrying trucks, instead of being mounted on the ends of a rotating axle may be constructed by any one versed in the art to slide vertically by means of levers or screws and nuts actuated by any electro-mechanical or other driving means.

It is also possible, in the arrangement described by way of example, to devise an entirely mechanical drive for the carrying axle. In such a case, it is merely necessary to replace the electric motor 21 by a gear wheel or belt transmission driven off the change speed gear or off any point of the actual transmission of the vehicle.

This drive may also be hydraulic acting for example directly on the crank 8 or a lever keyed to the axle 5. Hydraulic drives of this kind are to be found for example in tilting body motor vehicles, employed for the transport of materials.

The drive of the electric motor may also be varied in an infinite number of ways. It may for example be made automatic by mounting suitable contacts on the rod gear of the operating lever 43. The two pull rods 46 and 47 may also be replaced by a single contactor. It is furthermore possible to connect in the electric circuit a series of relays for automatically breaking the circuit in predetermined positions, and so forth.

All these combinations, which are very debatable from the practical point of view, will of course come within the scope of the invention.

I claim:

1. In a motor vehicle chassis, a front wheel axle with steering wheels always in steering contact with the ground, a rear wheel axle with wheels always operable as driving wheels, elastic suspension means for said rear axle, an endless track driving axle fixedly mounted on said chassis between the front and rear wheel axles at a fixed predetermined distance above the ground, an endless track front driving sprocket on each end of said driving axle, an endless track carried by each sprocket, load-carrying rollers on each side of said chassis engaging the ground-contacting stretches of the endless tracks and disposed between the aforesaid fixedly mounted driving axle and the rear wheel axle of the chassis, a single load-carrying axle mounted on the chassis between said driving axle and the rear wheel axle of the chassis, and means on each end of the carrying axle for transmitting the load carried thereby to the load-carrying rollers.

2. In a motor vehicle chassis, a front wheel axle with steering wheels always in steering contact with the ground, a rear wheel axle with wheels always operable as driving wheels, elastic suspension means for said rear axle, an endless track driving axle fixedly mounted on said chassis between the front and rear wheel axles at a fixed predetermined distance above the ground, an endless track front driving sprocket on each end of said driving axle, an endless track carrying pulley mounted on each side of the chassis at the rear of said rear wheel axle and at a fixed predetermined distance above the ground, an endless track on each side of the chassis mounted on the sprocket and pulley on the respective sides of the chassis and encircling the rear wheel axle in spaced relation thereto, a load-carrying truck on each side of the chassis positioned between said driving axle and the rear wheel axle, a single load-carrying axle mounted on said chassis between said driving axle and the rear wheel axle, and means for mounting the load-carrying trucks on the ends of said load-carrying axle.

3. In a motor vehicle chassis, a front wheel axle, a rear wheel axle, an endless track driving axle fixedly mounted on said chassis between the front and rear wheel axles at a fixed predetermined distance above the ground, an endless track driving sprocket on each end of said driving axle, an endless track carrying pulley mounted on each side of the chassis at the rear of said rear wheel axle and at a fixed predetermined distance above the ground, an endless track on each side of the chassis mounted on the sprocket and pulley on the respective sides of the chassis and encircling the rear wheel axle in spaced relation thereto, a load-carrying truck on each side of the chassis positioned between said driving axle and the rear wheel axle, a single load-carrying axle mounted on said chassis between said driving axle and the rear wheel axle, a crank on each end of said load-carrying axle, a crank pin on each crank, means for mounting the load-carrying trucks on the respective crank pins, and means for rotating said load-carrying axle to raise and lower said load-carrying trucks.

4. In a motor vehicle chassis, a front wheel axle, a rear wheel axle, an endless track driving axle fixedly mounted on said chassis between the front and rear wheel axles at a fixed predetermined distance above the ground, an endless track driving sprocket on each end of said driving axle, an endless track carrying pulley mounted on each side of the chassis at the rear of said rear wheel axle and at a fixed predetermined distance above the ground, an endless track on each side of the chassis mounted on the sprocket and pulley on the respective sides of the chassis and encircling the rear wheel axle in spaced relation thereto, a load-carrying truck on each side of the chassis positioned between said driving axle and the rear wheel axle, a single load-carrying axle mounted on said chassis between said driving axle and the rear wheel axle, a double-armed crank on each end of said load-carrying axle, means for pivotally mounting one of said load-carrying trucks on one arm of each crank, a suspension spring on each side of the chassis for supporting the rear wheel axle, means for securing the rear end of each spring to the chassis, means for securing the front end of each spring to the other arms of said respective cranks, and means for rotating said carrying axle to raise and lower the load-carrying trucks and simultaneously lower and raise the rear wheel axle.

5. In a motor vehicle chassis, a front wheel axle, a rear wheel axle, an endless track driving axle fixedly mounted on said chassis between the front and rear wheel axles at a fixed predetermined distance above the ground, an endless track driving sprocket on each end of said driving axle, an endless track carrying pulley mounted on each side of the chassis at the rear of said rear wheel axle and at a fixed predetermined distance above the ground, an endless track on each side of the chassis mounted on the sprocket and pulley on the respective sides of the chassis and encircling the rear wheel axle in spaced relation thereto, a load-carrying truck on each side of the chassis positioned between said driving axle and the rear wheel axle, a single load-carrying axle mounted on said chassis between said driving axle and the rear wheel axle, a double-armed crank on each end of said load-carrying axle, means for pivotally mounting one of said load-carrying trucks on one arm of each crank, a suspension spring on each side of the chassis for supporting the rear wheel axle, means for securing the rear end of each spring to the chassis, means for securing the front end of each spring to the other arms of said respective cranks, and means for rotating said carrying axle to raise and lower the load-carrying trucks and simultaneously lower and raise the rear wheel axle, said rotating means comprising a toothed segment fixedly mounted on the carrying axle, an electric motor, and a worm wheel driven by said motor.

6. In a motor vehicle chassis, a front wheel axle, a rear wheel axle, an endless track driving axle fixedly mounted on said chassis between the front and rear wheel axles at a fixed predetermined distance above the ground, an endless track driving sprocket on each end of said driving axle, an endless track carrying pulley mounted on each side of the chassis at the rear of said rear wheel axle and at a fixed predetermined distance above the ground, an endless track on each side of the chassis mounted on the sprocket and pulley on the respective sides of the chassis and encircling the rear wheel axle in spaced relation thereto, a load-carrying truck on each side of the chassis positioned between said driving axle and the rear wheel axle, a single load-carrying axle mounted on said chassis between said driving axle and the rear wheel axle, a double-armed crank on each end of said load-carrying axle, means for pivotally mounting one of said load-carrying trucks on one arm of each crank, a suspension spring on each side of the chassis for supporting the rear wheel axle, means for securing the rear end of each spring to the chassis, means for securing the front end of each spring to the other arms of said respective cranks, means for rotating said carrying axle to raise and lower the load-carrying trucks and simultaneously lower and raise the rear wheel axle, a power-driven shaft, and means operable in one position for directly coupling said shaft to the rear wheel axle alone and in another position for connecting said shaft through a speed reduction gear to said driving axle and through a separate speed reduction gear to the rear wheel axle.

ADOLPHE KÉGRESSE.